United States Patent [19]
Shindo

[11] Patent Number: 5,485,403
[45] Date of Patent: * Jan. 16, 1996

[54] METHOD AND APPARATUS FOR PROCESSING SIGNALS FROM PHOTOCONDUCTIVE SENSOR

[75] Inventor: Osamu Shindo, Tokyo, Japan

[73] Assignee: Asahi Kogaku Kogyo Kabushiki Kaisha, Tokyo, Japan

[*] Notice: The portion of the term of this patent subsequent to Jan. 16, 2013, has been disclaimed.

[21] Appl. No.: 623,566

[22] Filed: Dec. 7, 1990

[30] Foreign Application Priority Data

Dec. 7, 1989 [JP] Japan .................................. 1-316466
Dec. 7, 1989 [JP] Japan .................................. 1-316468

[51] Int. Cl.$^6$ .................................................. G06F 17/00
[52] U.S. Cl. .......................................... 364/559; 364/525
[58] Field of Search ...................... 354/400, 402, 354/406; 351/207, 209, 210; 364/413.01, 413.02, 188, 559, 525

[56] References Cited

U.S. PATENT DOCUMENTS

| | | | |
|---|---|---|---|
| Re. 31,370 | 9/1983 | Mashimo et al. | 354/402 |
| 3,864,030 | 2/1975 | Cornsweet | 351/210 |
| 4,047,187 | 9/1977 | Mashimo et al. | 354/402 |
| 4,183,642 | 1/1980 | Fukuoka | 354/402 |
| 4,574,314 | 3/1986 | Weinblatt | 354/400 |
| 4,636,624 | 1/1987 | Ishida et al. | 354/406 X |
| 4,648,052 | 3/1987 | Friedman et al. | 364/413.01 X |
| 4,786,934 | 11/1988 | Kunze et al. | 354/400 |
| 4,836,670 | 6/1989 | Hutchinson | 351/210 |
| 4,848,340 | 7/1989 | Bille et al. | 351/210 X |
| 5,002,384 | 3/1991 | Trachtman | 351/210 X |
| 5,036,347 | 7/1991 | Tsunekawa et al. | 354/400 |

FOREIGN PATENT DOCUMENTS

| | | |
|---|---|---|
| 0055338 | 7/1982 | European Pat. Off. . |
| 3841575 | 7/1989 | Germany . |
| 60-32012 | 2/1985 | Japan . |
| 60-41013 | 3/1985 | Japan . |
| 61-172552 | 8/1986 | Japan . |
| 1412707 | 11/1975 | United Kingdom . |
| 8701571 | 3/1987 | WIPO . |
| WO87/01571 | 3/1987 | WIPO . |

OTHER PUBLICATIONS

J. Merchant; "Fixation Point Measurement by the Oculometer Technique"; *Optical Enginee4ring*; Jul/Aug., 1974; pp. 339–342.
Young et al.; "Method and Design–Survey of Eye Movement Recording Methods"; *Behavior Research Methods and Instrumetation*; vol. 7(5), 1975; pp. 397–429.
English Abstract of Japanese Patent No. 60–32012.
English Abstract of Japanese Patent No. 60–41013.
English Abstract of Japanese Patent No. 62–47612.
English Abstract of Japanese Patent No. 62–189415.
M. Ikeda; "Pyschological Physic of Vision"; (1979).

*Primary Examiner*—Ellis B. Ramirez
*Attorney, Agent, or Firm*—Sandler, Greenblum & Bernstein

[57] ABSTRACT

A signal processing method for detecting a point of change from a first signal level to a second signal level, outputted from a line sensor having a photoconductive bit element array including setting a threshold level between the first signal level and the second signal level. A pair of bit elements are detected which have outputs that are larger than and smaller than the threshold level. A first line is determined based on the outputs of the pair of bit elements or a pair of bit elements which have a specific relationship to the above-mentioned pair of bit elements. A zero-cross bit element located at an intersecting point of the first line with a zero level is obtained. A second line, which has an inclination angle that is smaller than that of the first line, is determined based on the outputs of the zero-cross bit element and a bit element having a specific relationship to the zero-cross bit element or the outputs of a pair of bit elements having a specific relationship to the zero-cross bit element. A point of change is determined by the intersecting point of the first line and the second line.

19 Claims, 13 Drawing Sheets

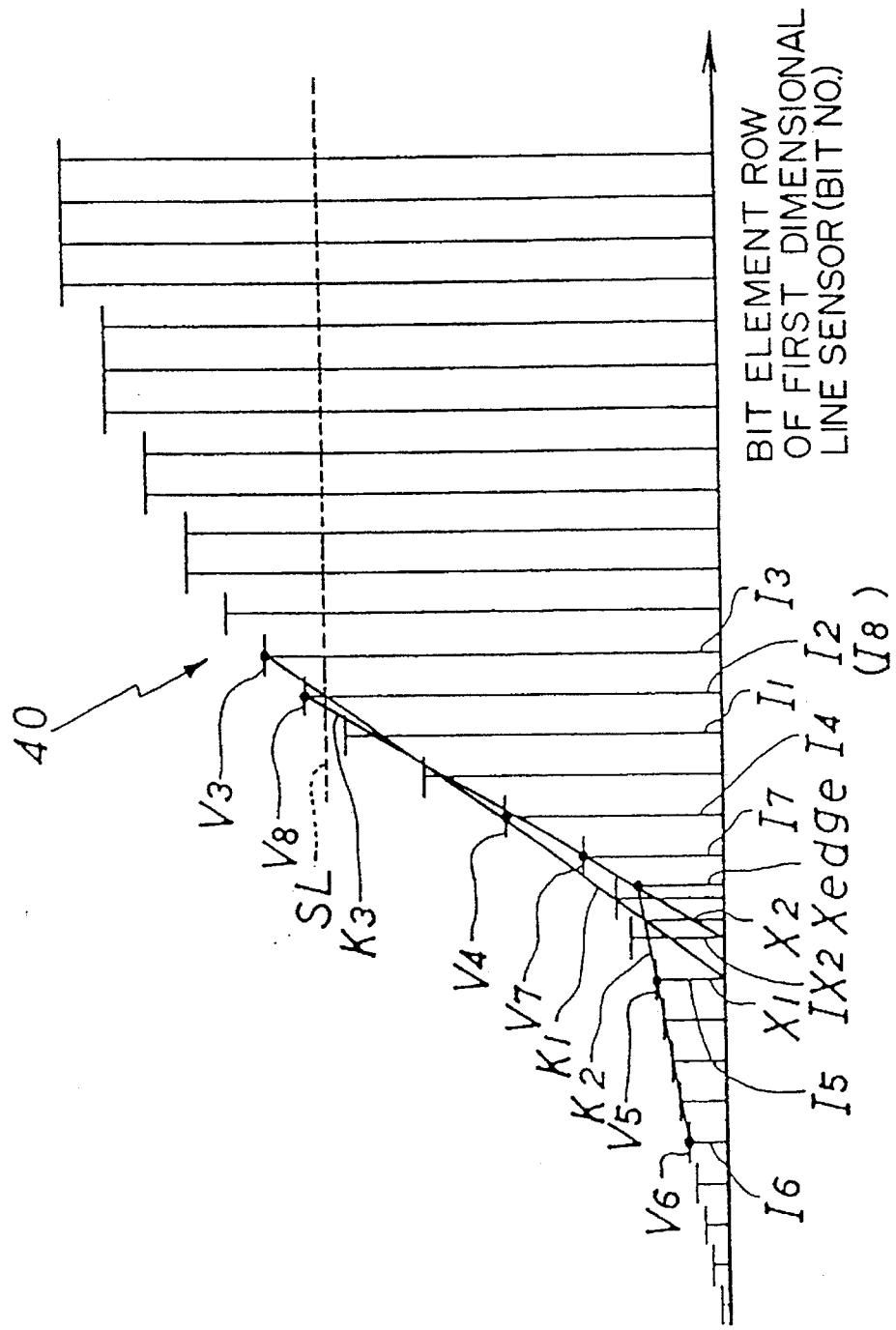

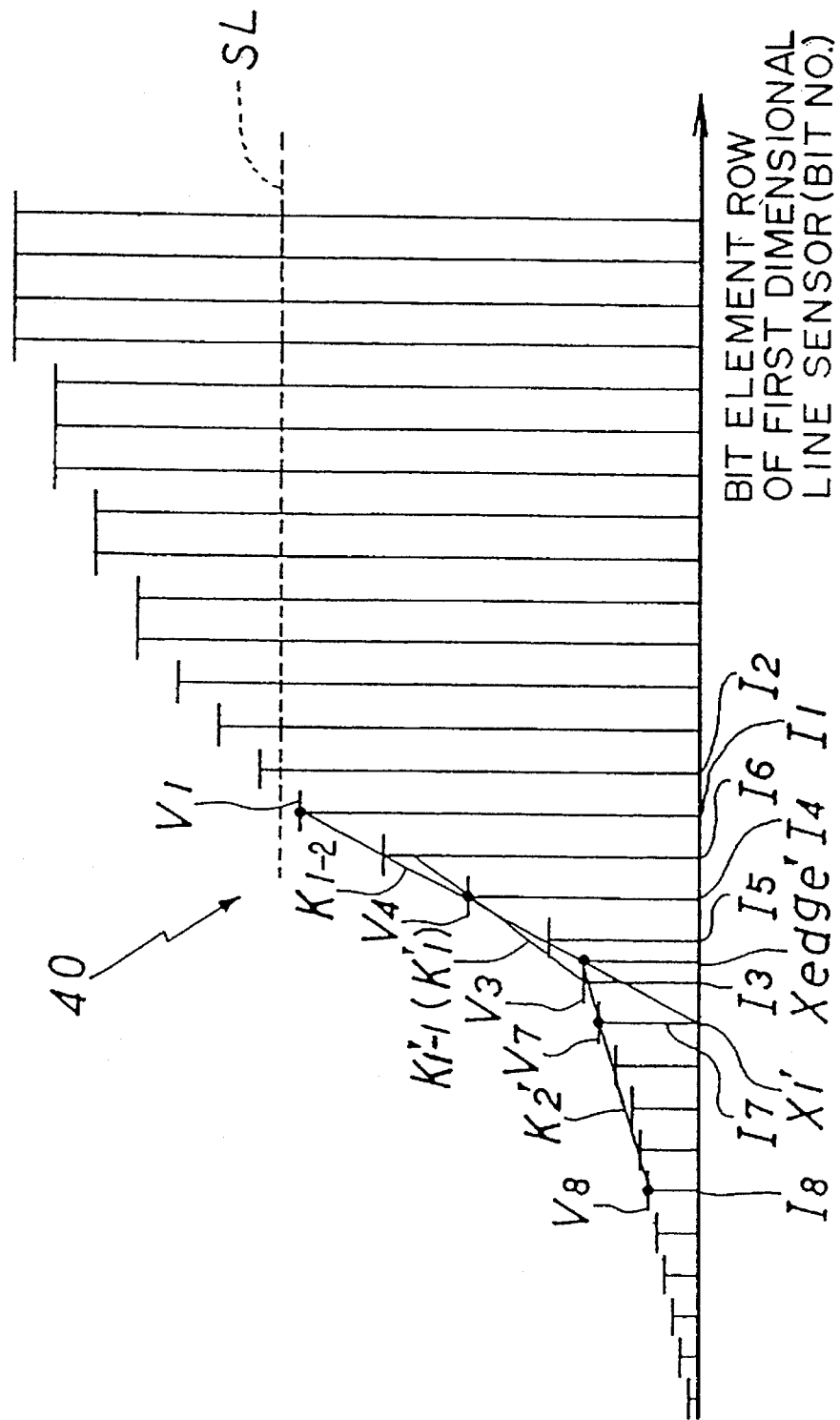

1

METHOD AND APPARATUS FOR PROCESSING SIGNALS FROM PHOTOCONDUCTIVE SENSOR

CROSS-REFERENCE TO RELATED APPLICATIONS

The present invention is related to the following commonly assigned applications: Ser. No. 07/982,427, filed on Nov. 27, 1992; Ser. No. 07/576,191, filed on Aug. 27, 1990; Ser. No. 07/606,928, filed on Oct. 31, 1990; Ser. No. 07/618,965, filed on Nov. 28, 1990; Ser. No. 07/619,975, filed on Nov. 30, 1990; and Ser. No. 07/623,570, filed on Dec. 7, 1990.

BACKGROUND OF THE INVENTION

1. Field of the Invention

The present invention relates to a signal processing method for detecting a point of change from a first signal level to a second signal level, and more precisely it relates to that especially suitable for an eye direction detecting apparatus.

This application is related to the commonly assigned application Ser. No. 07/982,427 (U.S. Pat. No. 5,327,191), the disclosure of which are expressly incorporated in its entirety by reference herein.

2. Description of Related Art

In theory, a photoelectric signal must change in light quantum level at a clear boundary from a first signal level to a second signal level. However, in practice, the change in the amount of light often does not occur at a clear boundary point, due to various noises. It is important to precisely detect the point of change in order to perform various signal processings. To this end, in a known detecting method, an appropriate threshold level is set between the first signal and the second signal level so that the point of change can be detected by the threshold level. However, in this known detecting method, if the signal includes noise, no precise detection can be expected. In addition, although when there is a regularity (e.g. symmetry with respect to a center), the detection of the point of change can be easily detected, if there is no regularity, it is difficult to precisely detect the point of change.

For example, in an eye direction detecting apparatus which detects the eye direction of a human being, the boundary (point of change) between a signal component (first signal level) corresponding to a reflection light flux from an iris and a reflection light flux (second signal level) from an eyeground must be exactly detected, since the boundary represents the pheripheral edges of the pupil. If no peripheral edge of the pupil can be accurately detected, no eye direction can be precisely detected. However, generally speaking, the electric signal to which the light signal including the reflection light fluxes from an eyeground (also referred to as a retina portion of the eye) and the iris is converted usually includes noise, thus resulting in an unclear boundary (point of change). This makes it difficult to precisely detect the boundary.

SUMMARY OF THE INVENTION

Accordingly, the primary object of the present invention is to provide a signal processing method which can precisely detect a point of change from a first signal level to a second signal level, outputted from a line sensor having a photoconductive bit element array.

Another object of the present invention is to provide an eye direction detecting method which can precisely detect the eye direction, using the signal processing method mentioned above.

To achieve the object mentioned above, according to the first aspect of the present invention, there is provided a signal processing method for detecting a point of change from a first signal level to a second signal level, outputted from a line sensor having a photoconductive bit element array, comprising the steps of setting a threshold level between the first signal level and the second signal level, detecting a pair of bit elements which have outputs larger than and smaller than the threshold level, respectively, determining a first line based on the outputs of the pair of bit elements or on the outputs of another pair of bit elements which have a specific relationship to the above-mentioned pair of bit elements, obtaining a zero-cross bit element which is located at an intersecting point of the first line with a predetermined output level, determining a second line which has an inclination angle whose absolute value is smaller than that of the first line, based on the outputs of the zero-cross bit element and a bit element having a specific relationship to the zero cross bit element or the outputs of a pair of bit elements having a specific relationship to the zero-cross bit element, and determining the point of change by the intersecting point of the first line and the second line.

According to another aspect of the present invention, the first line determining step comprises obtaining a group of lines based on the outputs of pairs of bit elements and selecting the first line from the group of lines.

Preferably, the first line selected from the group of lines has the largest inclination angle.

According to another aspect of the present invention, it is possible to additionally include a step of determining a third line which has an inclination angle the absolute value is larger than that of the first line with reference to the zero-cross bit element and determining the point of change by an intersecting point of the third line and the second line.

Preferably, the threshold level is approximately a median of the first and second signal levels.

The present invention can also be applied to an eye direction detecting apparatus. Namely, according to the present invention, there is provided a signal processing method in an eye direction detecting apparatus having a line sensor comprised of a photoconductive bit element array on which an eye direction detecting light flux reflected from an eye impinges, so that the line sensor generates output signals including a first signal level corresponding to a light flux reflected by an iris and a second signal level corresponding to a light flux reflected by an eyeground, whereby information on the point of change between the first signal level and the second signal level is used to detect the eye direction, comprising the steps of setting a threshold level between the first signal level and the second signal level, detecting a pair of bit elements which have outputs larger than and smaller than the threshold level, respectively, determining a first line based on the outputs of the pair of bit elements or on the outputs of another pair of bit elements which have a specific relationship to the above-mentioned pair of bit elements, obtaining a zero-cross bit element which is located at an intersecting point of the first line with a predetermined output level, determining a second line which has an inclination angle whose absolute value is smaller than that of the first line, based on the outputs of the zero-cross bit element and a bit element having a specific relationship to the zero cross bit element or the outputs of a pair of bit elements having a specific relationship to the zero-cross bit element, and determining the point of change by the intersecting point of the first line and the second line.

BRIEF DESCRIPTION OF THE DRAWINGS

The present invention will be described below in detail with reference to the accompanying drawings, in which:

FIGS. 1A and 1B are schematic diagrams of different embodiments of the present invention, in which a signal processing method according to the present invention is applied to an eye direction detecting method;

DESCRIPTION OF THE PREFERRED EMBODIMENTS

The following discussion will be directed to an embodiment of the invention in which the eye direction detecting method is applied to an auto focusing optical system of a single lens reflex camera.

Figure 2:
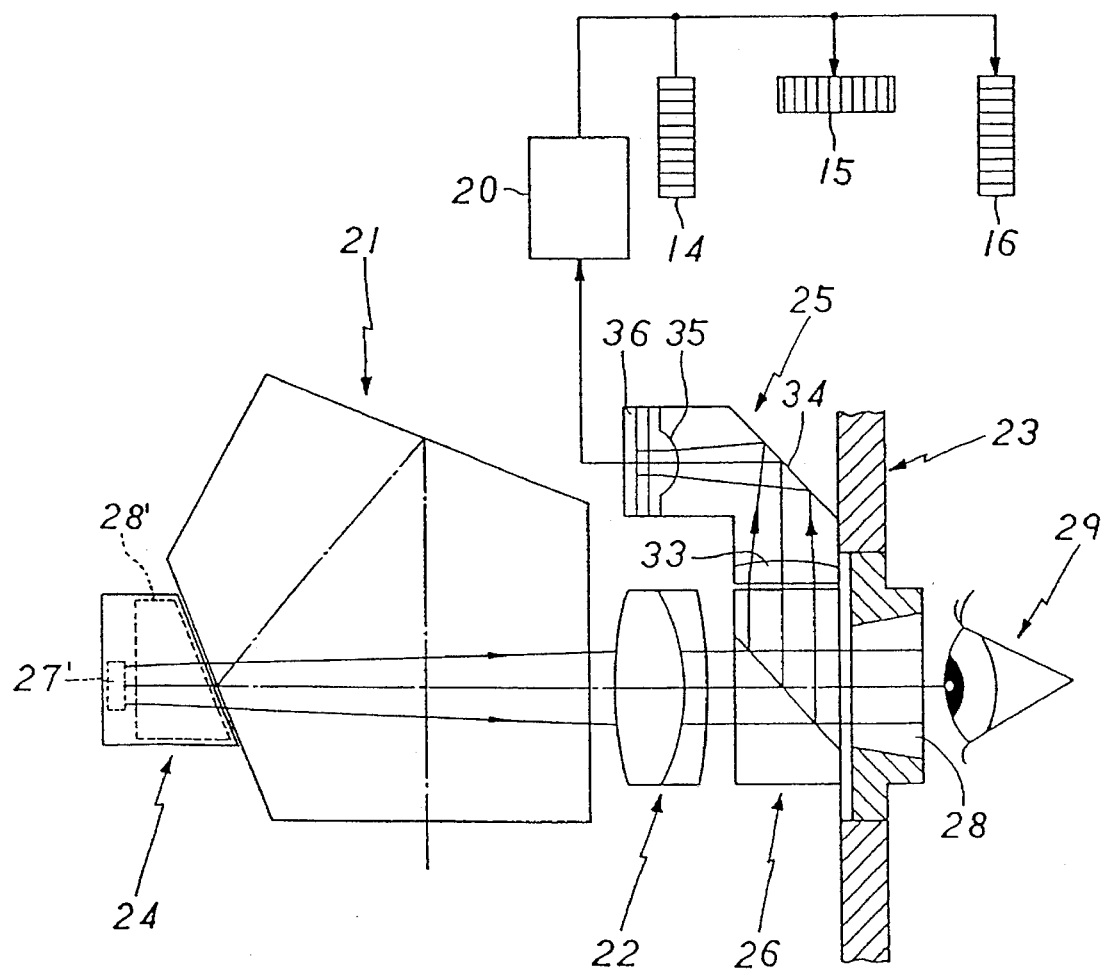
FIG. 2 is a schematic view of a main part of an optical system in an eye direction detecting apparatus according to the present invention.
Figure 3:
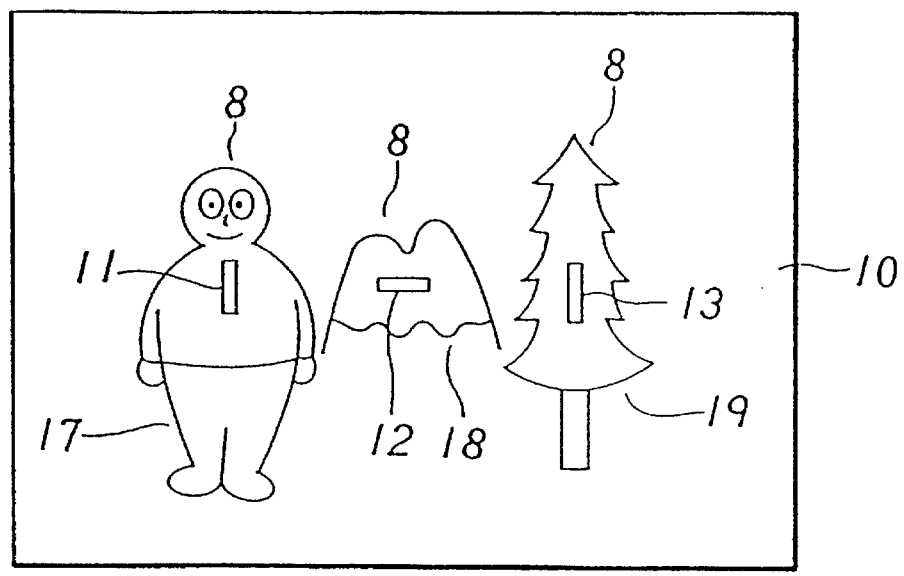
FIG. 3 is a schematic view of a finder field of view in a single lens reflex camera which has therein an eye direction detecting apparatus according to the present invention.

In FIG. 3, which shows a finder field of view of a single lens reflex camera, there are three focusing zones 11,12 and 13 in the finder field of view. The distance between the centers of the focusing zones 11, 12 and 13 is about 9 mm in the illustrated embodiment. A single lens reflex camera has auto focusing optical systems (not shown) corresponding to the focusing zones 11, 12 and 13. The auto focusing optical systems have focusing zones (not shown) corresponding to the zones 11, 12 and 13 at positions conjugate with the focusing zones 11, 12 and 13. The auto focusing optical systems corresponding to the focusing zones 11, 12 and 13 have CCDs 14, 15 and 16, as shown in FIG. 2. Images of subjects 17, 18 and 19 to be taken are formed on the CCDs 14, 15 and 16 by a pair of separator lenses (not shown), which constitute a part of the auto focusing optical systems.

The CCDs 14, 15 and 16 are selectively driven in accordance with an output signal of a processing circuit 20 of an eye direction detecting apparatus which will be described hereinafter.

The following discussion will be addressed to a general construction of an optical system of the eye direction detecting apparatus (FIG. 2).

In FIG. 2, numeral 21 designates a pentagonal prism, 22 an eyepiece lens, 23 a camera frame, 24 a eye direction detecting light transmission system of the eye direction detecting apparatus, 25 a light receiving system of the eye direction detecting apparatus, and 26 a beam splitter. The light transmission system 24 has a light source 27' and a compensator prism 28'. The light source 27' emits an infrared eye direction detecting light which is transmitted through the compensator prism 28' and the pentagonal prism 21 to impinge upon the eyepiece lens 22, so that the infrared light is collimated thereby. The collimated infrared light flux is introduced to a finder window 28 through the beam splitter 26. When a photographer looks at the finder window 28 with his or her eye 29, the photographer can observe the subjects 17, 18 and 19, as shown in FIG. 3. At the same time, the collimated infrared light flux for detecting the eye direction is projected to the photographer's eye.

Figure 4:
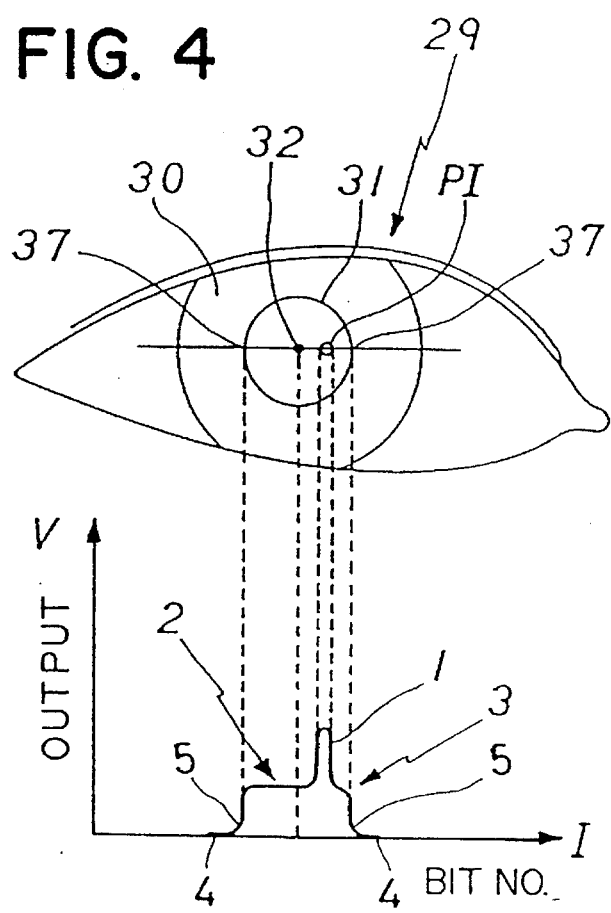
FIG. 4 is an explanatory view of a first Purkinje image which is formed on an eye, using an eye direction detecting apparatus of the present invention.

By the projection of the collimated infrared light flux, a first Purkinje image PI is formed on a cornea 30 of the eye 29, as shown in FIG. 4. A part of the infrared light flux reaches the eyeground through the cornea 30. It is known that the position of the first Purkinje image PI varies as the eye ball rotates to change the eye direction. Accordingly, the rotating angle of the eye ball can be obtained by the positional relationship between the first Purkinje image PI and the center 32 (or the edge) of the pupil 31. This is disclosed in detail, for example, in application Ser. No. 07/982,427 (U.S. Pat. No. 5,327,191).

Figure 6:
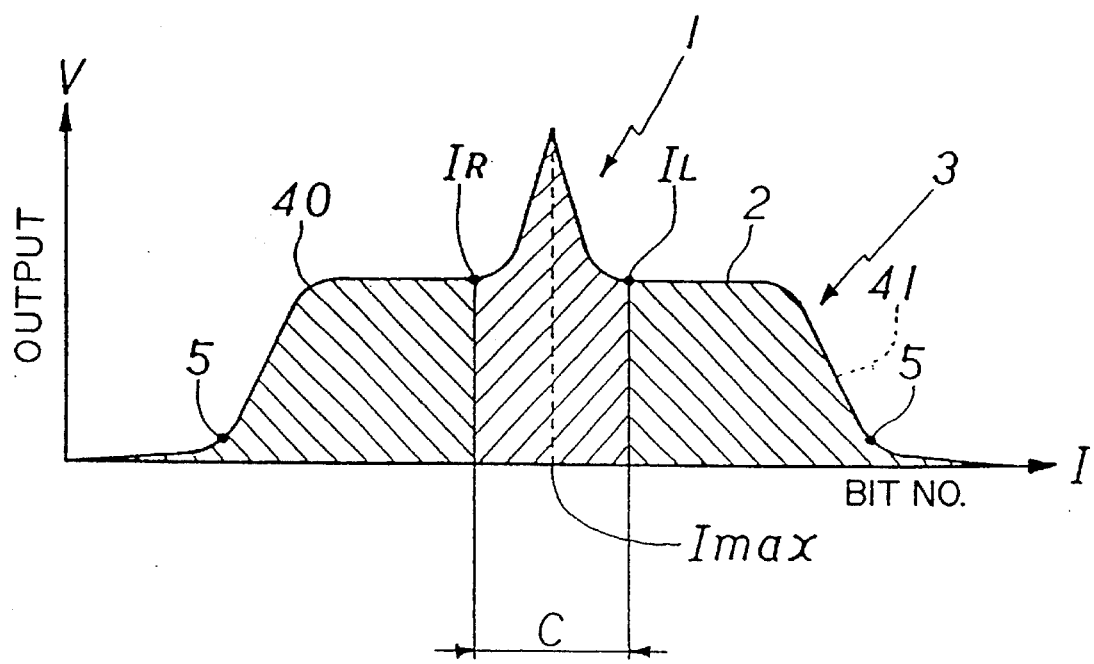
FIG. 6 is a diagram showing the process for removing a peak component from a photoelectric signal distribution curve.
Figure 7:
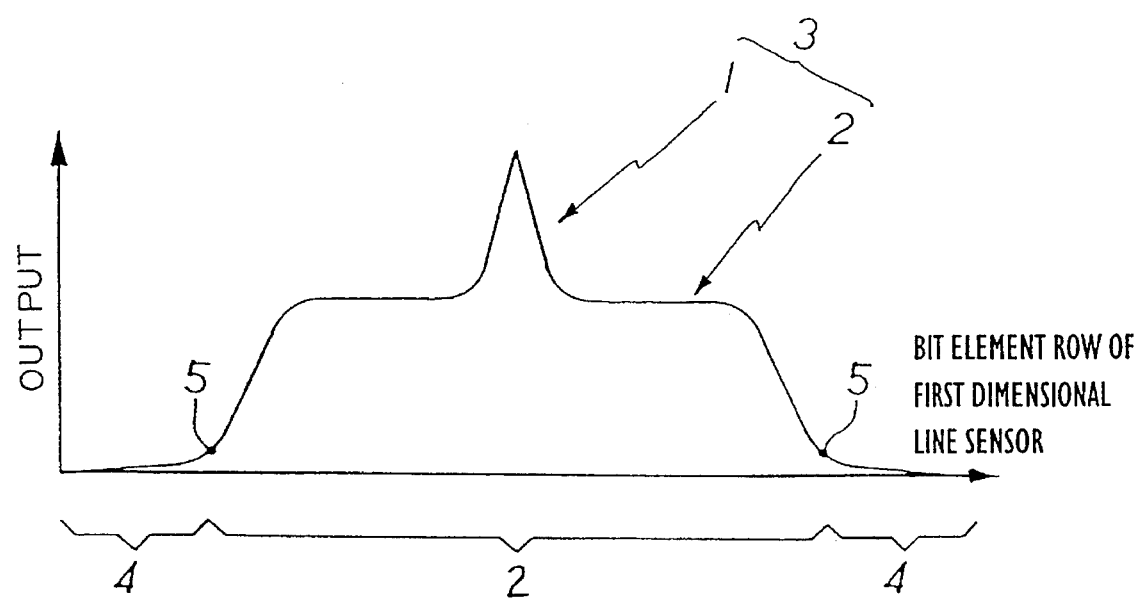
FIG. 7 is a diagram showing a model of photoelectric signal distribution curve.

The light flux reflected from the eyeground and the light flux from the cornea 30 are again made incident upon the beam splitter 26 through the finder window 28. As a result, the fluxes are reflected by the beam splitter 26 toward the light receiving system 25. The light receiving system 25 includes a condenser lens 33, a mirror 34, an image forming lens 35 and a first dimensional line sensor (CCD) 36, which has a large number of photoconductive bit elements having a predetermined width. An image of the reflection light flux reflected by the eyeground and the the first Purkinje image PI, based on the reflection light flux reflected by the cornea 30, are formed in the first dimensional line sensor 36. The first dimensional line sensor 36 outputs a photoelectric signal corresponding to the images. The photoelectric signal distribution curve 3 contains a peak component 1 corresponding to the first Purkinje image PI, a signal component 2 corresponding to the light flux reflected from the eyeground, and a signal component 4 corresponding to the reflection light flux from the an iris as shown in FIGS. 6 and 7. The photoelectric signal which defines the photoelectric distribution curve 3 is inputted to the processing circuit 20.

FIGS. 6 and 7 show an ideal model of the photoelectric signal distribution curve 3. Supposing that portion 4 corresponding to the reflection light flux from the iris is the first signal level and portion 2 corresponding to the reflection light flux from the eyeground is the second signal level, there is a clear difference between the two portions 4 and 2, due to the difference in reflectivity. The boundaries (points of change) 5, 5 between the two signal levels define two diametrically opposed points 37, 37 of the pupil. The eye direction is determined in accordance with the relative positional relationship between peak component 1 by the first Purkinje image PI and the pupil (e.g., the center or the opposite points 37 thereof, etc). It is very important to exactly detect the points of change 5 in order to precisely detect the eye direction.

Figure 8A:
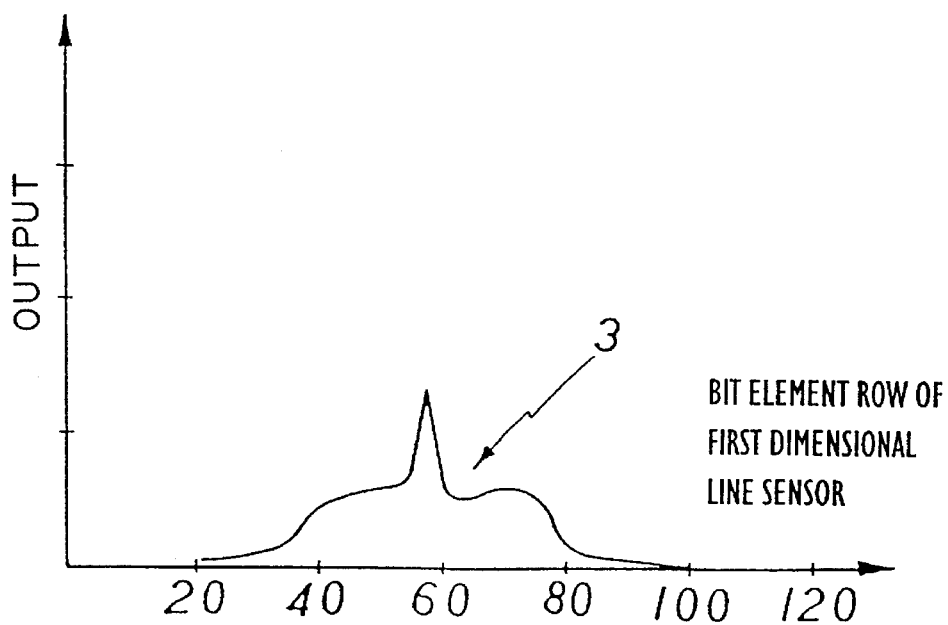
FIGS. 8A. 8B and 8C are diagrams of outputs of photoelectric signals measured in the present invention; and, FIGS. 9, 10A, 10B, 11 and 12 are flow charts of processes of an eye direction detecting method according to the present invention.
Figure 8B:
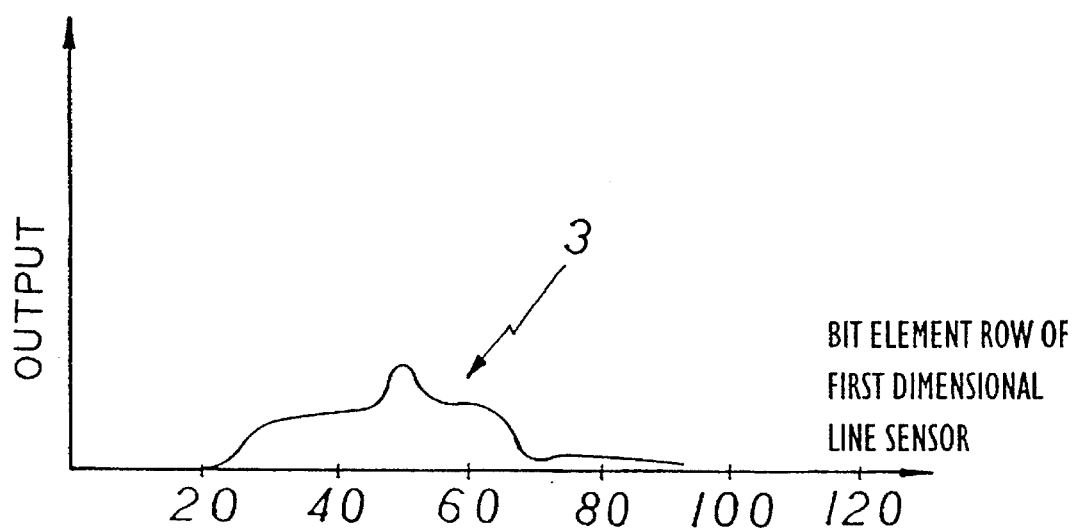
Figure 8C:
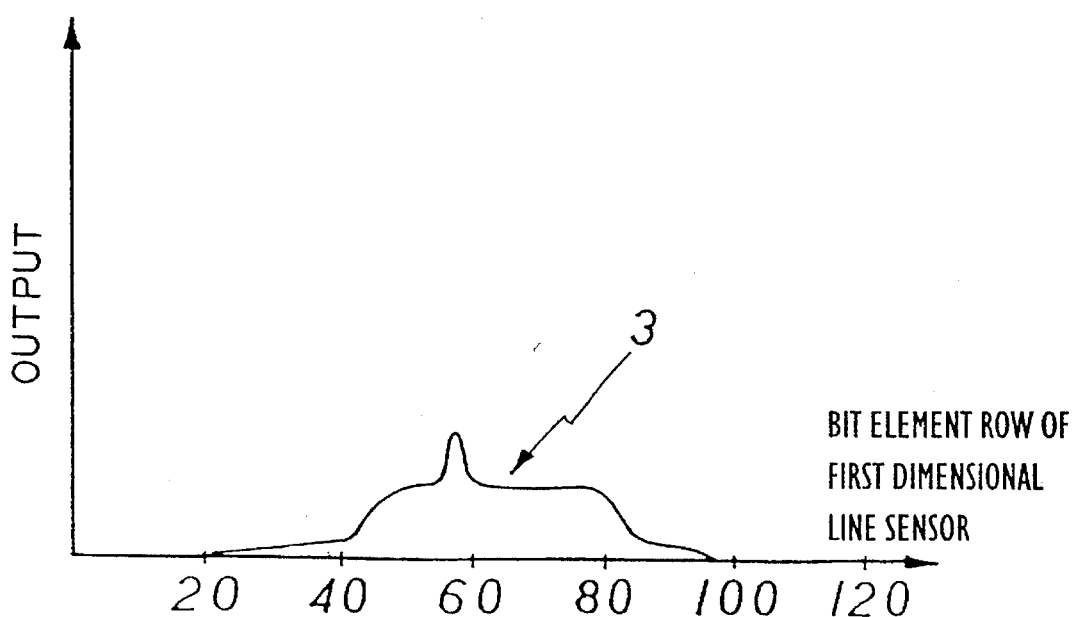

There is no difficulty in detecting the points of change 5 in FIGS. 6 and 7 in which the points 5 clearly appear therein. However, the photoelectric signal distribution curve 3 which is actually obtained has no clear points of change 5, as can be seen in FIGS. 8A, 8B and 8C. FIGS. 8A, 8B and 8C show the photoelectric signal distribution curves 3 in cases where the eye direction is oriented to the central focusing zone 11, the left focusing zone 13, and the right focusing zone 12, respectively.

The present invention is aimed at detecting the points of change 5 from the photoelectric signal 3 that have no clear points of change due to noises, so as to thereby detect the eye direction from the result of the detection of the points of change.

Figure 9:
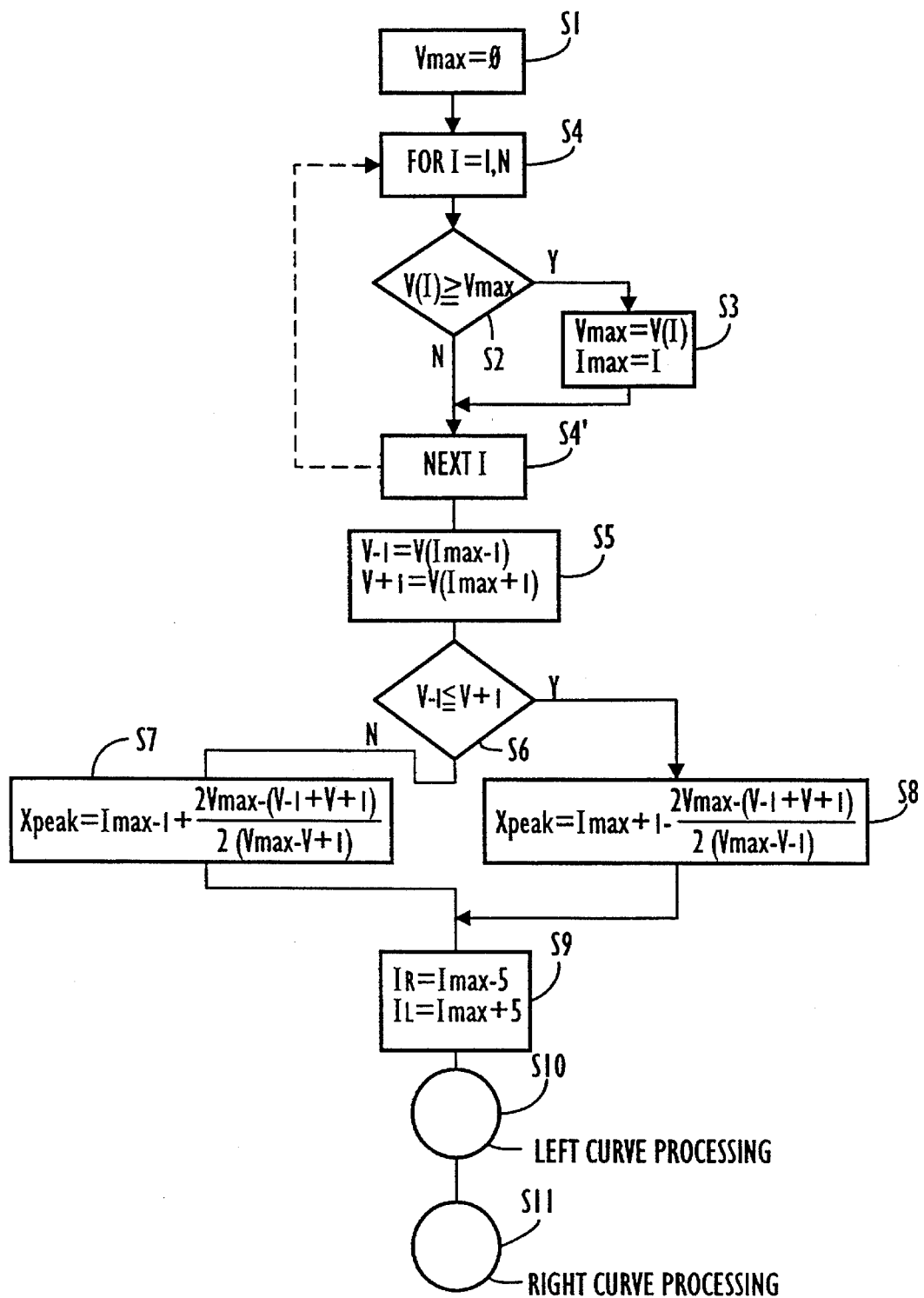

To this end, signal processing circuit 20 performs the following operations in accordance with a predetermined arithmetic operation program:

(1) To detect the position of the first Purkinje image PI:

(1)-① Step to detect a bit element corresponding to the peak value of the photoelectric signal distribution curve 3:

In this step, to obtain a maximum value by the conventional method, which is per se known, an initial value Vmax=0 (step S1 in FIG. 9) is set in a maximum value storing memory (not shown) as a provisional maximum value Vmax. The bit elements of the first dimensional line sensor, the number of which is N, are successively retrieved from the left to right to find a bit element which outputs a value exceeding the provisional maximum value Vmax. Thus, the bit element detected is renewed as a bit element having a second provisional maximum value Vmax, so that the address Imax of the bit element corresponding to the second provisional maximum value Vmax is stored in a bit address storing memory (not shown).

In other words, the second provisional maximum value Vmax is compared with the output V (I) of the bit element number I at step S2. If V(I)≧Vmax, Vmax=V(I) and Imax=I are set at step S3. Conversely, if V(I)<Vmax, the address number of the bit element is increased by one at step S4, and the operation at step S2 is repeated.

The above-mentioned operations from steps S1 to S4 are repeated until I=N, namely, the above mentioned operations are performed for the final bit element (N-th bit element). Consequently, a real maximum value (peak value) Vmax is stored in the maximum value storing memory, and the address Imax of the corresponding bit element is stored in the bit address storing memory.

Figure 5:
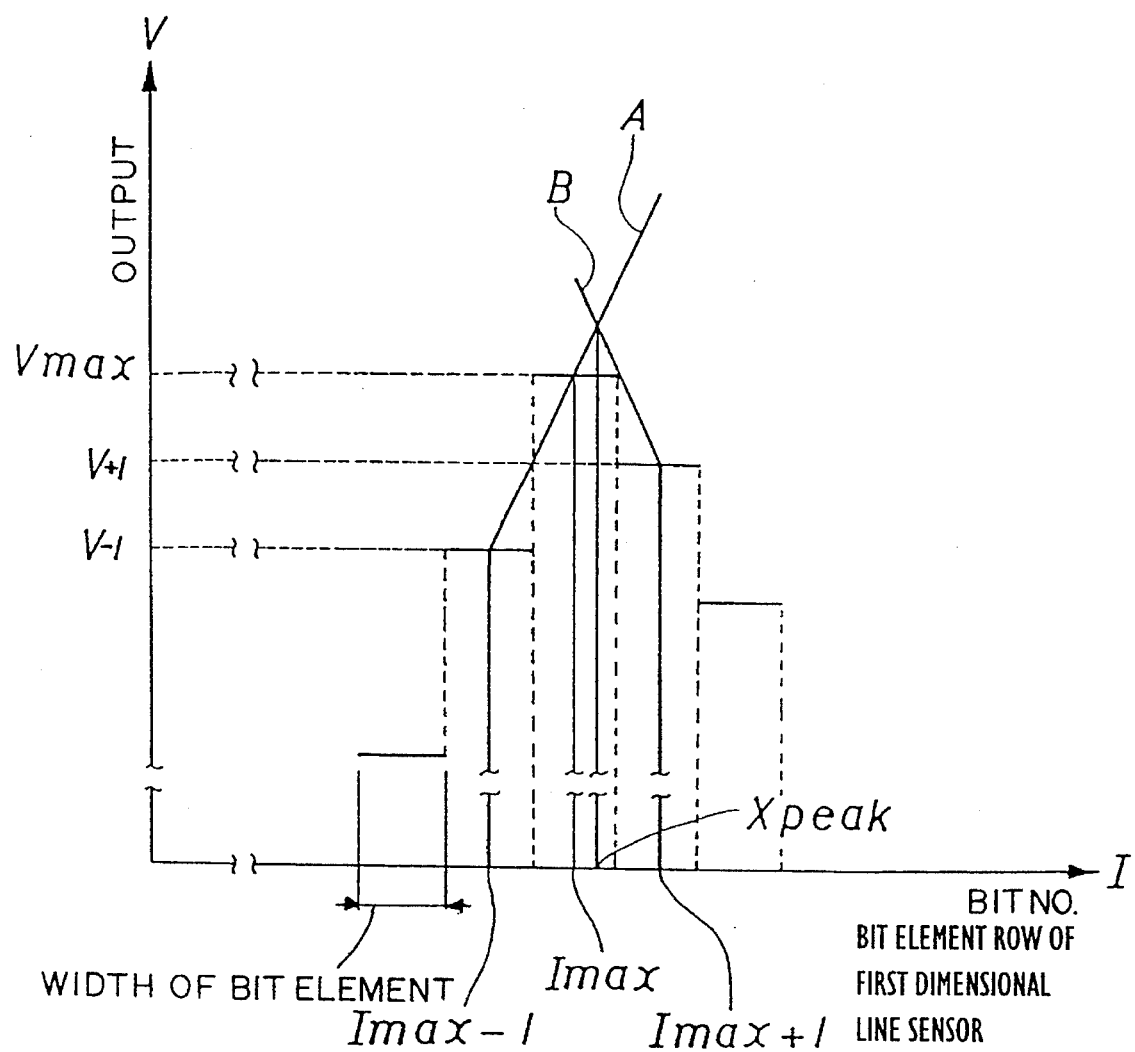
FIG. 5 is a view similar to FIG. 4, for explaining the process for obtaining a position of a peak value (peak position) of a wave shape of a signal in a signal processing circuit shown in FIG. 2, based on an interpolation method.

(1)-② Step to detect the position of the first Purkinje image PI as an interpolation coordinate Xpeak, using the bit element which outputs the maximum value (FIGS. 5 and 9):

In this step, the number Imax of the bit element and the real maximum value Vmax are read out from the bit address storing memory and the maximum value storing memory, respectively.

Thereafter, the number Imax−1 of the bit element next left to Imax is read out from the bit address storing memory, so that the output value V(Imax−1) of the Imax−1 bit element is stored as $V_{-1}$ in the maximum value storing memory. In addition, the number Imax+1 of the bit element next right to Imax is read out from the bit address storing memory so that the output value V(Imax+1) of the Imax−1 bit element is stored as $V_{+1}$ in the maximum value storing memory (step S5).

After that, $V_{-1} \leq V_{+1}$ is judged at step S6. Then, the control proceeds to step S7 or S8 to obtain the interpolation coordinate Xpeak.

If the output $V_{-1}$ of the Imax−1 bit element is equal to the output $V_{+1}$ of the Imax+1 bit element, it can be considered that the peak value is given at the central position of the Imax bit element. However, since the output $V_{-1}$ is not usually equal to the output $V_{+1}$, and since the bit element has a certain width, the value Xpeak is obtained by an interpolation method used in the present invention.

If $V_{-1} \leq V_{+1}$ at step S6, an intersecting point of lines A and B (FIG. 5) is obtained by the following equation which mathematically gives an inclination of a line at step S8;

$$Xpeak=Imax+1-[\{2 \cdot Vmax-(V_{-1}+V_{+1})\}/2 \cdot (Vmax-V_{-1})]$$

If $V_{-1} > V_{+1}$ at step S6, the following equation is used instead thereof at step S7;

$$Xpeak=Imax-1+[\{2 \cdot Vmax-(V_{-1}+V_{+1})\}/2 \cdot (Vmax-V_{+1})]$$

Thus, the position of the first Purkinje image PI can be obtained as the interpolation coordinate Xpeak, based on the bit element which outputs the peak value and a pair of bit elements on the opposite sides of the bit element.

(2) To withdraw bit elements relating the first Purkinje image PI from the subject to be operated:

In this process, the bit elements corresponding to the peak component 1 (FIG. 6) are withdrawn from the operation. This can be achieved by not reading the outputs of the bit elements on the right and left sides of the Imax bit element. In FIG. 6, the bit elements included in an area designated at C are withdrawn from the subject to be operated.

The number of bit elements which are to be withdrawn depend on the optical property of the eye direction detecting apparatus and the widths of the bit elements of the first dimensional line sensor 36. Preferably, it is determined by looking at the wave shape of the photoelectric signal distribution curve 3 which can be displayed on a cathode-ray tube display.

In the illustrated embodiment, the bit elements between the 4th bit elements (Imax−4) and (Imax+4) counted from the bit element Imax which outputs the real maximum value Vmax in the opposite directions thereof are withdrawn.

Thereafter, to determine the threshold levels of the bit elements on the right and left sides of the withdrawn bit elements, upon detecting the diametrically opposed points 37 of the pupil (iris) which will be discussed below, right end bit element $I_R$ of the curve 40 on the left side and left end bit element $I_L$ of the curve 41 on the right side are obtained, as follows: the bit element number Imax−5 is stored in the portion of the memory corresponding to the right end bit element $I_R$. After that, bit element number Imax+5 is stored in the portion of the memory corresponding to the left end bit element $I_L$ (step S9).

(3) To detect the diametrically opposed points 37 of the pupil (iris):

In this process, the points of change 5 are detected based on the photoelectric signal distribution curve 3, which constitutes one of the most significant features of the present invention. Two embodiments therefor are given below; the first embodiment is shown in FIGS. 1A and 10A, and second embodiment in FIGS. 1B and 10B.

Figure 10A:
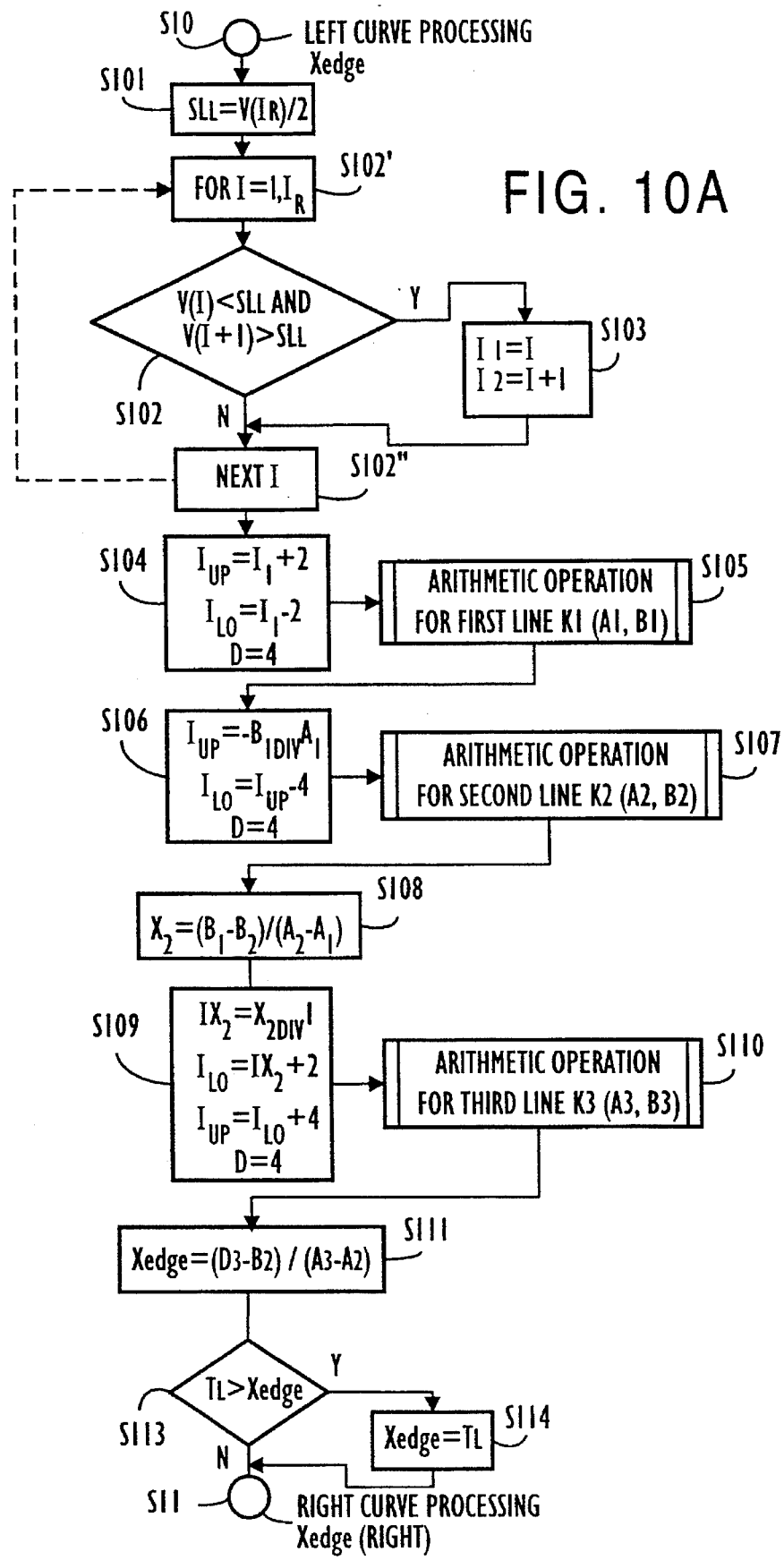

In the first embodiment shown in FIGS. 1A and 10A, the outputs of the bit elements with removed bit elements outputting the peak component 1 are used to detect the points of change 5 for the left and right curves 40 and 41. Since the operation for the right curve 41 is symmetrical to that for the left curve 40 with respect to the peak component 1, the following discussion will be directed only to the operation for the left curve 40.

(3)-① A threshold level SL, which is below the output value $V(I_R)$ of the right end bit element $I_R$ ($I_R$=Imax−5) of the right curve 40 is set as shown in FIG. 1A. Preferably, the threshold level SL is approximately half the output value $V(I_R)$ of the bit element $I_R$. Namely, in the illustrated embodiment, $SL_L = V(I_R)/2$ (Step S101 in FIG. 10).

Whether or not the outputs $V(I)$ and $V(I_{+1})$ of two adjacent bit elements are below and above the threshold level $SL_L$, respectively, is checked at step S102. This is repeated from I=1 until I=$I_R$ (step S102'). When the two adjacent bit elements which satisfy the above condition are found, they are stored in the memory as $I_1$ and $I_2$ (FIG. 1A), respectively (step S103).

(3)-② A first line K1 is obtained to detect the point of change 5 using the Newton method.

First, the second bit element $I_1$+2 (=I3) from the bit element $I_1$ in the right direction and the second bit element $I_1$−2(=I4) from the bit element $I_1$ in the left direction are obtained and stored in portions $I_{U\,P}$ and $I_{L\,O}$ of the memory (step S104). Also, D=4 is stored in the memory. "D" means the bit numbers between $I_3$ and $I_4$. Thereafter, control proceeds to step S105 to perform an arithmetic operation for determining a first line K1. Namely, the first line K1 is obtained by connecting the output values $V_3$ and $V_4$ corresponding to $I_3$ and $I_4$, respectively. It can be considered that the outputs of the bit elements, including and adjacent to the bit elements $I_1$ and $I_2$, are located along the first line K1 or the vicinity thereof. The line K1 has an inclination angle $A_1$ and an intercept (an output at a reference bit) $B_1$ given by the following equations, respectively:

$$A = \{V(I_{U\,P}) - V(I_{L\,O})\}/D$$

$$B = \{I_{U\,P} \times V(I_{L\,O}) - I_{L\,O} \times V(I_{U\,P})\}/D$$

(3)-③ An intercepting point $X_1$, at which the first line K1 intersects the zero level (predetermined level), is obtained. Thereafter, a bit element which is closest to the point $X_1$ on the left side is set as a zero-cross bit element ($I_5$). This can be obtained by memorizing the value (−$B_1$ DIV $A_1$) at the memory portion $I_{U\,P}$. ($B_1$ DIV $A_1$) is given by the following equation.

$$B_1 \text{ DIV } A_1 = SGN(B/A) \cdot INT(ABS(B/A))$$

wherein ABS(B/A) means an absolute value of B/A, INT means an integral number of B/A which is rounded to the nearest smaller integer, and SGN means a sign for judging negative and positive of the value of B/A, respectively. Thus, the zero-cross bit element is obtained.

Figure 12:
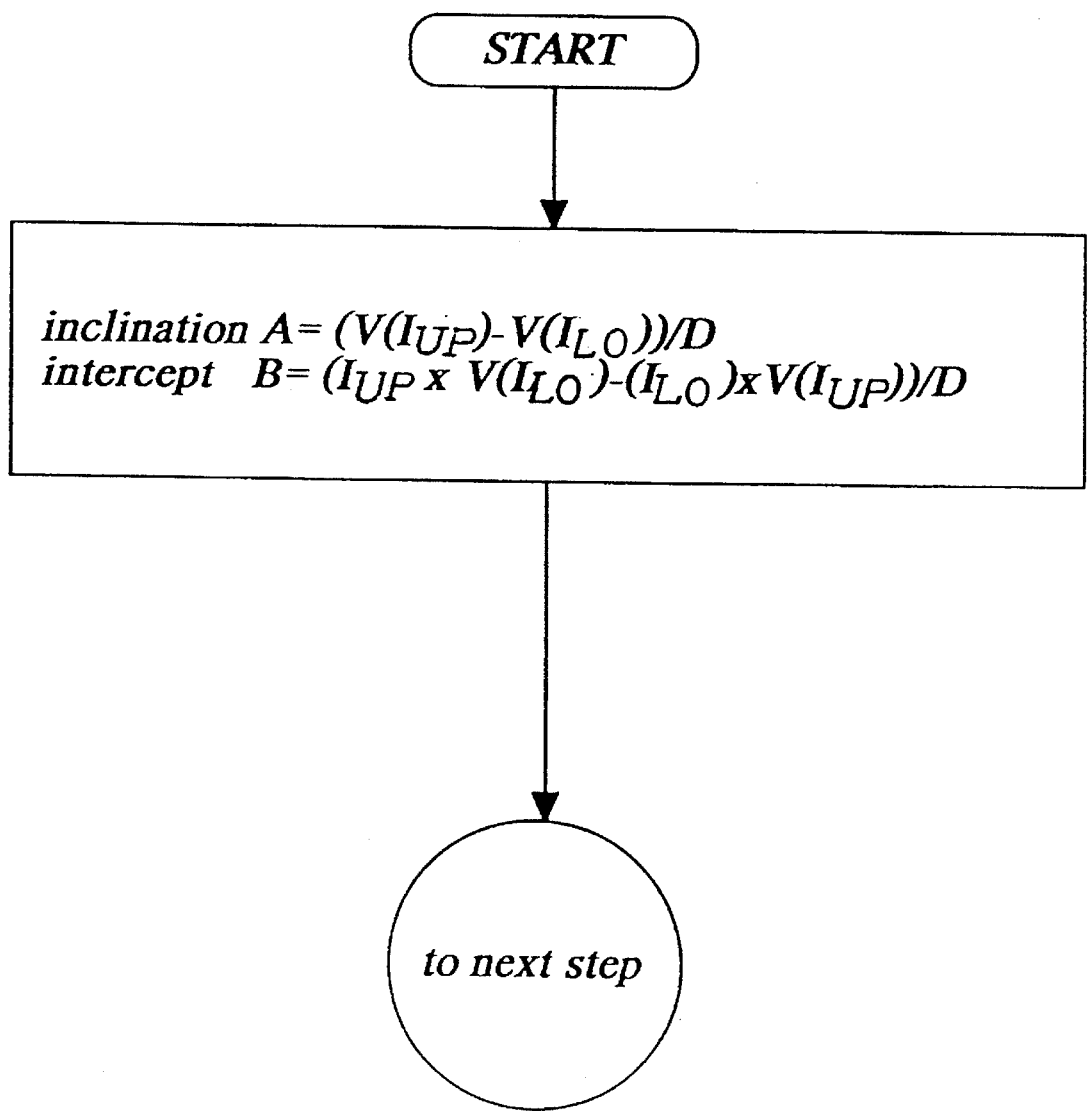

Thereafter, the 4th bit element $I_{U\,P}$−4 (=$I_6$) counted from the zero-cross bit element $I_5$ in the left direction is memorized in the memory portion $I_{L\,O}$ (step S106). After that, control proceeds to step S107 in FIG. 10A to perform an arithmetic operation routine for obtaining the second line K2 shown in FIG. 12. The second line K2 is obtained by connecting the output value $V_6$ of the bit element $I_6$ and the output value $V_5$ of the zero-cross bit element $I_5$. It can be considered that the outputs of the bit elements, including and adjacent to the bit elements $I_5$ and $I_6$ are located along the second line K2 or the vicinity thereof. The second line K2 has an inclination angle $A_2$ that is smaller than that of the first line K1. The inclination angle $A_2$ and an intercept $B_2$ can be obtained in a similar way to the first line K1.

(3)-④ An intersecting point $X_2$ of the first line K1 and the second line K2 is mathematically given by the following formula at step S108:

$$X_2 = (B_1 - B_2)/(A_2 - A_1)$$

In the simplest way, the intersecting point $X_2$ thus obtained is the point of change 5 of the photoelectric signal distribution curve 3. This is practically satisfactory.

To detect the point of change 5 with a higher precision, it is possible to determine a third line K3 using the intersecting point $X_2$ in the present invention, as mentioned below. Namely, a third line K3, which has an inclination angle (absolute value) larger than that of the first line K1 is obtained, based on the bit elements in the vicinity of the intersecting point $X_2$, as will become apparent from the explanation in the following step (3)-⑤. The change of point 5 is given by an intersecting point of the second line K2 and the third line K3.

(3)-⑤ A bit element $I_{X\,2}$ which is closest to the left of the intersecting point $X_2$ is obtained by the following equation:

$$I_{X\,2} = X_2 \text{ DIV } 1$$

As a result, the third line K3 is obtained by connecting the output value $V_7$ of the second bit element $I_7$ counted from the bit element $I_{X\,2}$ in the right direction and the output value $V_8$ of the 4th bit element $I_8$ (which is identical to the $I_2$ in this embodiment) counted from the bit element $I_7$. Namely, the value ($X_2$+2) is stored in memory portion $I_{L\,O}$ and the value ($I_{L\,O}$+4) is stored in the memory portion $I_{U\,P}$ to designate the bit element to be used (step S109). After that, control proceeds to step S110 to perform an operation for obtaining the third line K3, shown in FIG. 12 having an inclination angle $A_3$ and an intercept $B_3$. It can be considered that the outputs of the bit elements including and adjacent to the bit elements $I_2$ and $I_7$ are located along the second line K3 or the vicinity thereof. The line K3 represents the outputs of the bit elements along therewith with higher precision than the first line K1. The inclination angle A3 and the intercept B3 can be obtained in a similar way to the first line K1.

(3)-⑥ An intersecting point Xedge of the second line K2 and the third line K3 is obtained by the following equation at step S111:

$$Xedge = (B_3 - B_2)/(A_3 - A_2)$$

The intersecting point Xedge thus obtained more precisely corresponds to the point of change 5 which defines one of the diametrically opposed points 37 of the pupil.

The above mentioned operations are performed for the right curve 41 to obtain the other diametrically opposed point 37 of the pupil. The center of the pupil can be given by a mean value of the coordinates of the diametricaly opposed points 37.

Figure 11:
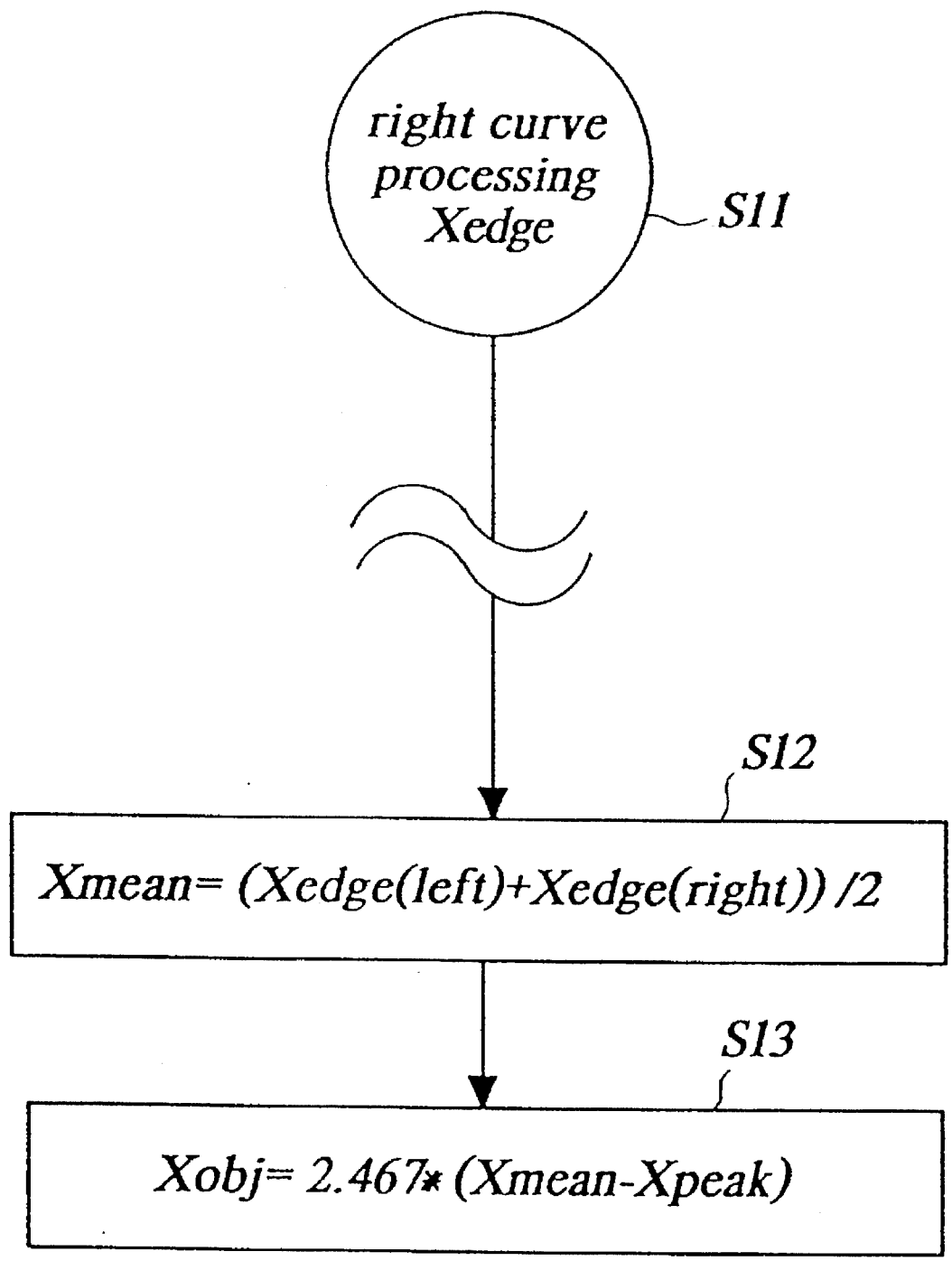

Upon switching the operation from the left curve 40 to the right curve 41, it is determined whether the value of Xedge is above a certain limit TL (step S113). If the limit TL is above Xedge, the latter is set to be TL (Xedge=TL) so as to perform the operation for the right curve 41 (step S11). Conversely, if the limit TL is equal to or smaller than Xedge, the control is directly transferred to the operation for the right curve (step S11 in FIG. 11). Similar operations are performed for the right curve.

When the operation for the right curve is completed, a mean value Xmean of the intersecting points of Xedge (left and right sides) is obtained to detect the center of the pupil (step S12). Thereafter, position Xobj of the X coordinate is obtained by the following arithmetic formula, using the mean value Xmean and the interpolation coordinate Xpeak to detect the eye direction (step S13):

$$Xobj = C \cdot (Xmean - Xpeak)$$

The coefficient C of the formula is a value obtained by the principle of the detection of the eye direction. In U.S. Ser.

Nos. 07/282,035 (U.S. Pat. No. 5,327,191) and 07/576,191 (U.S. Pat. No. 5,327,191), the coefficient C is 2.467.

It was experimentally confirmed that the eye direction, i.e., the above mentioned Xobj was −9 mm (X=−9 mm) when the eye direction was oriented to the left focusing zone 11 and 9 mm (X=9 mm) when the eye direction was directed to the right focusing zone 13, respectively, wherein the position of the central focusing zone 12 was 0 mm (X=0 mm).

Figure 10B:
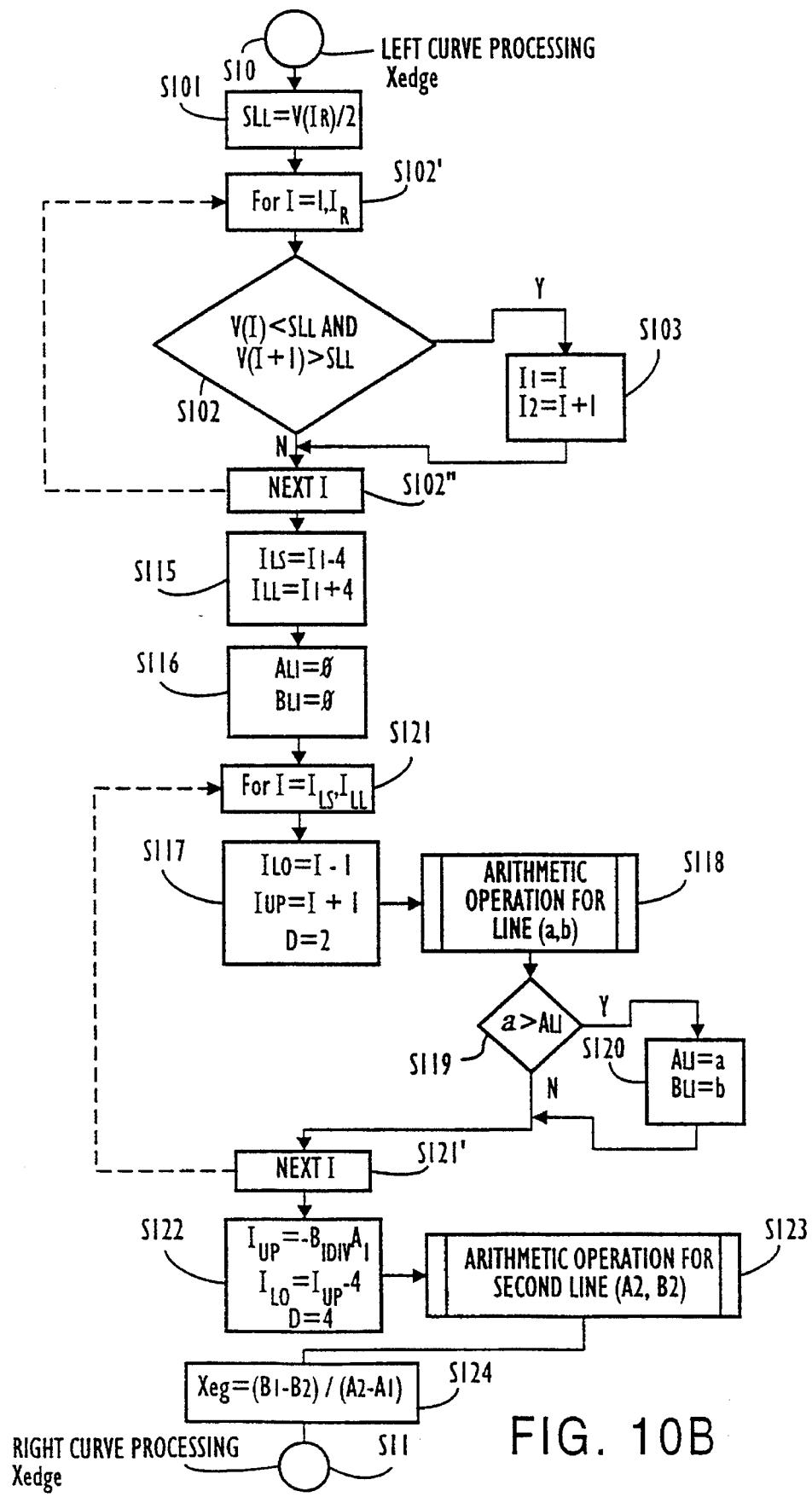

The following description will be addressed to the second embodiment of the present invention, shown in FIGS. 1B and 10B. The second embodiment is featured by the direct detection of Xedge' without obtaining the third line K3, unlike the first embodiment. In the second embodiment, the processes for determining the threshold level SL and obtaining the bit elements $I_1$ and $I_2$ which outputs smaller and larger outputs than the threshold level SL are the same as those in the first embodiment. The main difference between the first and second embodiment resides in the process for obtaining the first line K1'.

(3)-②' To obtain the points of change 5 using the Newton method, the following operations are effected in the second embodiment.

The processes for obtaining the first line K1' are performed for the bit elements between the 4th bit element $I_1-4$ (=$I_{L\ S}$) reckoned from the bit element $I_1$ in the left direction and the 4th bit element $I_1+4$ (=$I_{L\ L}$) reckoned from the bit element $I_1$ in the right direction. Every two bit elements make one pair which define a line. Pairs of bit elements, each pair consisting of every two bit elements define a group of lines. For example, a first pair consisting of first and third bit elements defines one line, and a second pair consisting of second and 4th bit elements define another line. In practice, a group of lines are determined by the outputs of the pairs of bit elements. For example, in the illustrated embodiment, the output $V_3$ of the bit element $I_3$ and the output $V_4$ of the bit element $I_4$ define a line K1'. Similarly, output $V_1$ of the bit element $I_1$ and output $V_4$ of the bit element $I_4$ define the line K1'−2. To perform this operation, $I_{L\ S}=I_1-4$ and $I_{L\ L}=I_1+4$ are stored in the memory at step S115.

After that, initial values $A_{L\ 1}=0$ and $B_{L\ 1}=0$ are set at the corresponding memory portions at step S116. Nos. I−1 and I+1 are stored in the memory portions $I_{L\ O}$ and $I_{U\ P}$, and D=2 is stored in the corresponding memory portion, respectively (step S117). After that, the control proceeds to step S118 to perform the arithmetic operation for a line relating to the bits I−1 and I+1. Inclination angle $\underline{a}$ and intercept (output) $\underline{b}$ of the line are given by the following equations:

$$a=\{V(I_{U\ P})-V(I_{L\ O})\}/D$$

$$b=\{I_{U\ P}\times V(I_{L\ O})-I_{L\ O}\times V(I_{U\ P})\}/D$$

The inclination angle $\underline{a}$ is compared with the inclination angle stored in the memory portion $A_{L\ 1}$, (step S119). If $a>A_{L\ 1}$, control proceeds to step S120 to renew the memory portions $A_{L\ 1}$, and $B_{L\ 1}$, so that the inclination angle $\underline{a}$ and the intercept $\underline{b}$ obtained in step S118 are stored in the memory portions $A_{L\ 1}$ and $B_{L\ 1}$, respectively. This is repeated from I=$I_{L\ S}$ until I=$I_{L\ L}$ to obtain a line having the largest inclination angle (step S121).

In the illustrated embodiment, line K1'−1 defined by the bit element $I_1$ and the bit element $I_4$ has the largest inclination angle and corresponds to the first line K1'.

As can be understood from the foregoing, the second embodiment is characterized in that the first line K1' is obtained by the line having the largest inclination angle thus obtained.

(3)-③ After that, the position $X_1'$ at which the first line K1' intersects the zero level is obtained. The bit element closest to the position $X_1'$ on the left side is set as the zero-cross bit element $I_7$. This can be obtained by storing the value ($-B_1$ DIV $A_1$) at the memory portion $I_{U\ P}$. ($B_1$ DIV $A_1$) is given by the following equation:

$$B\ DIV\ A=SGN(B/A)\cdot INT(ABS(B/A))$$

wherein ABS(B/A) means an absolute value of B/A, INT means an integral number of B/A which is rounded to a nearest smaller integer, and SGN means a sign for determining whether the value of B/A is negative or positive, respectively. Thus, the zero-cross bit element is obtained.

Thereafter, the 4th bit element $I_{U\ P}-4$ (=$I_8$) counted from the zero-cross bit element $I_7$ in the left direction is stored in the memory portion $I_{L\ O}$ (step S122). After that, control proceeds to step S123 in FIG. 10B to perform a routine for the arithmetic operation for obtaining the second line K2' in FIG. 12. The second line K2' is obtained by connecting the output value $V_8$ of the bit element $I_8$ and the output value $V_7$ of the zero-cross bit element $I_7$. The second line K2' has an inclination angle $A_2$ that is smaller than that of the first line K1'. The inclination angle $A_2$ and an intercept $B_2$ can be obtained in the similar way to the first line K1'.

In the second embodiment, the second line K2' must be obtained by an output of a zero-cross bit element and an output of a bit element which is Spaced from the zero-cross bit element by one or more than one bit element.

(3)-④' An intersecting point-Xedge' of the first line K1' and the second line K2' is mathematically obtained. The point of change 5 is given by the intersecting point Xedge' to determine one of the diametrically opposed points 37 of the pupil.

The subsequent processes are the same as those in the first embodiment.

Although specific bit elements counted from a reference bit element are selected to determine the first, second and third lines K1, K1', K2, K2' and K3 in the above mentioned embodiments, the photoconductive bit elements of the line sensor to be selected depends on the size thereof, or the optical property of the photoconductive signals to be processed, etc.

I claim:

1. A method of analyzing output signals of a line sensor, the line sensor including an array of photoconductive bit elements, for determining a point of change from a first output signal level to a second output signal level of signals outputted from the array of photoconductive bit elements of the line sensor, said method comprising the steps of:

setting a threshold level between the first signal level and the second signal level;

detecting a pair of bit elements from among said array of photoconductive bit elements which have outputs that are larger than and smaller than the threshold level, respectively;

determining a first line based on the outputs of the pair of bit elements or on the outputs of another pair of bit elements from among said array of photoconductive bit elements which have a specific relationship to the pair of bit elements;

obtaining a zero-cross bit element which is located at an intersecting point of the first line with a predetermined output level;

determining a second line which has an inclination angle in absolute value that is smaller than that of the first line, based on the outputs of the zero-cross bit element and a bit element having a specific relationship to the zero-cross bit element or the outputs of a pair of bit elements having a specific relationship to the zero-cross bit element; and determining the point of change by the intersecting point of the first line and the second line.

2. A signal processing method according to claim 1, wherein the step of determining the first line comprises obtaining a group of lines based on the outputs of pairs of bit elements and selecting the first line from the group of lines.

3. A signal processing method according to claim 2, wherein the first line selected from the group of lines has the largest inclination angle.

4. A signal processing method according to claim 1, further comprising determining a third line which has an inclination angle in absolute value that is larger than that of the first line with reference to the zero-cross bit element.

5. A signal processing method according to claim 4, further comprising determining the point of change by an intersecting point of the third line and the second line.

6. A signal processing method according to claim 1, wherein the step of setting the threshold comprises setting the threshold level to approximately a median of a higher signal level of the first or second signal levels.

7. A signal processing method in an eye direction detecting apparatus having a line sensor comprised of a photoconductive bit element array on which eye direction detecting light flux reflected from an eye ball impinges, so that the line sensor generates output signals including a first signal level corresponding to a light flux reflected by an iris and a second signal level corresponding to a light flux reflected by an eyeground, whereby information of a point of change between the first signal level and the second signal level is used to detect the eye direction, said method comprising the steps of:

setting a threshold level between the first signal level and the second signal level;

detecting a pair of bit elements which have outputs that are larger than and smaller than the threshold level, respectively;

determining a first line based on the outputs of the pair of bit elements or on the outputs of another pair of bit elements which have a specific relationship to the pair of bit elements;

obtaining a zero-cross bit element which is located at an intersecting point of the first line with a predetermined output level;

determining a second line which has an inclination angle in absolute value smaller than that of the first line, based on the outputs of the zero-cross bit element and a bit element having a specific relationship to the zero-cross bit element or the outputs of a pair of bit elements having a specific relationship to the zero-cross bit element; and determining the point of change of the intersecting point of the first line and the second line.

8. A signal processing method according to claim 7, wherein the eye direction is determined in accordance with a relative positional relationship between the point of change and a peak value of the photoconductive signals defined by a first Purkinje image.

9. A signal processing method according to claim 7, wherein the first line determining step comprises obtaining a group of lines based on the outputs of pairs of bit elements and selecting the first line from the group of lines.

10. A signal processing method according to claim 9, wherein the first line selected from the group of lines has the largest inclination angle.

11. A signal processing method according to claim 7, further comprising determining a third line which has an inclination angle in absolute value larger than that of the first line with reference to the zero-cross bit element.

12. A signal processing method according to claim 11, further comprising determining the point of change by an intersecting point of the third line and the second line.

13. A signal processing method according to claim 7, wherein the step of setting the threshold comprises setting the threshold level to approximately a median of a higher signal level of the first or second signal levels.

14. A signal processing method according to claim 7, further comprising the step of directing a source of light toward the eye, said light being reflected and impinged on said line sensor.

15. An apparatus for detecting a point of change from a first signal level to a second signal level of signals outputted from a line sensor having an array of photoconductive bit elements, said apparatus comprising:

means for detecting a pair of said bit elements which have outputs that are larger than and smaller than a predetermined threshold level, respectively, said predetermined threshold level being between the first signal level and the second signal level;

means for determining a first line based on the outputs of the pair of bit elements or on the outputs of another pair of bit elements which have a specific relationship to the pair of bit elements;

means for obtaining a zero-cross bit element which is located at an intersecting point of the first line with a predetermined output level;

means for determining a second line which has an inclination angle absolute value that is smaller than that of the first line, based on the outputs of the zero-cross bit element and a bit element having a specific relationship to the zero-cross bit element or the outputs of a pair of bit elements having a specific relationship to the zero-cross bit element; and means for determining the point of change by the intersecting point of the first line and the second line.

16. An apparatus for detecting the position of a periphery between adjacent areas of a physical object, said adjacent areas having different light reflectivity characteristics, said apparatus comprising:

(a) an array of photoconductive bit elements, each of said bit elements comprising means for converting levels of reflectivity to respective output signals;

(b) means for determining a point of change between a first output signal level and a second output signal level along said array of bit elements, said point of change determining means comprising:

(i) means for detecting a pair of said bit elements which have outputs that are larger than and smaller than a predetermined threshold level, respectively, said predetermined threshold level being between the first signal level and the second signal level;

(ii) means for determining a first line based on the outputs of the pair of bit elements or on the outputs of another pair of bit elements which have a specific relationship to the pair of bit elements;

(iii) means for obtaining a zero-cross bit element which is located at an intersecting point of the first line with a predetermined output level;

(iv) means for determining a second line which has an inclination angle absolute value that is smaller than that of the first line, based on the outputs of the zero-cross bit element and a bit element having a specific relationship to the zero-cross bit element or the outputs of a pair of bit elements having a specific relationship to the zero-cross bit element; and (v) means for determining the point of change by the intersecting point of the first line and the second line.

17. An eye direction detecting apparatus comprising:

(a) a line sensor comprising an array of photoconductive bit elements, said line sensor to receive light reflected from the eye, said line sensor comprising means for generating output signals representative of a distribution of reflected light along said line sensor, said output signals from said line sensor comprising a first signal level corresponding to a light flux reflected by an iris of the eye and a second signal level corresponding to a light flux reflected by an eyeground and generating an output signal distribution curve; and (b) means for determining a point of change between said first signal level and said second signal level along said line sensor, said point of change determining means comprising:

(i) means for setting a threshold level between the first signal level and the second signal level;

(ii) means for detecting a pair of bit elements which have outputs that are larger than and smaller than the threshold level, respectively;

(iii) means for determining a first line based on the outputs of the pair of bit elements or on the outputs of another pair of bit elements which have a specific relationships of the pair of bit elements;

(iv) means for obtaining a zero-cross bit element which is located at an intersecting point of the first line with a predetermined output level;

(v) means for determining a second line which has an inclination angle in absolute value smaller than that of the first line, based on the outputs of the zero-cross bit element and a bit element having a specific relationship to the zero-cross bit element or the outputs of a pair of bit elements having a specific relationship to the zero-cross bit element; and (vi) means for determining the point of change of the intersecting point of the first line and the second line.

18. The eye direction detecting apparatus according to claim 17, further comprising means for determining a peak value of said output signals, representative of a first Purkinje image, and means for determining eye direction in accordance with a relative positional relationship between the point of change and said peak value.

19. The eye direction detecting apparatus according to claim 18 in combination with a camera which has a plurality of focus detecting devices, said combination comprising means for selecting one of said plurality of focus detecting devices in response to said detection of eye direction.

* * * * *

UNITED STATES PATENT AND TRADEMARK OFFICE
CERTIFICATE OF CORRECTION

PATENT NO. : 5,485,403
DATED : January 16, 1996
INVENTOR(S) : O. SHINDO

It is certified that error appears in the above-indentified patent and that said Letters Patent is hereby corrected as shown below:

On the cover page, item [56], "References Cited", "OTHER PUBLICATIONS", line 2, change "Enginee4ring" to ---Engineering---.

On the cover page, item [56], "References Cited", "OTHER PUBLICATIONS", line 4, change "Method" to ---Methods---.

On the cover page, item [56], "References Cited", "OTHER PUBLICATIONS", line 11, change "Pyschological" to ---Psychological---.

At column 13, line 30 (claim 17, line 23), change "a specific relationships of" to ---a specific relationship to---.

Signed and Sealed this

Fifteenth Day of October, 1996

Attest:

BRUCE LEHMAN

*Attesting Officer*  *Commissioner of Patents and Trademarks*